(12) United States Patent
Grasselt et al.

(10) Patent No.: US 7,496,887 B2
(45) Date of Patent: Feb. 24, 2009

(54) INTEGRATION OF DATA MANAGEMENT OPERATIONS INTO A WORKFLOW SYSTEM

(75) Inventors: Mike Grasselt, Leinfelden-Echterdingen (DE); Matthias Kloppmann, Sindelfingen (DE); Albert Maier, Tuebingen-Kilchberg (DE); Oliver Suhre, Stuttgart (DE); Matthias Tschaffler, Herrenberg (DE); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 11/070,529

(22) Filed: Mar. 1, 2005

(65) Prior Publication Data

US 2006/0200797 A1 Sep. 7, 2006

(51) Int. Cl.
*G06F 9/44* (2006.01)
(52) U.S. Cl. .................................................. 717/101
(58) Field of Classification Search ................. 717/100, 717/154–156, 101–103
See application file for complete search history.

(56) References Cited

U.S. PATENT DOCUMENTS

| 7,027,997 | B1* | 4/2006 | Robinson et al. ............... 705/9 |
| 7,350,188 | B2* | 3/2008 | Schulz ....................... 717/104 |
| 2002/0032692 | A1* | 3/2002 | Suzuki et al. ............... 707/200 |
| 2002/0078432 | A1* | 6/2002 | Charisius et al. ............ 717/102 |
| 2003/0004935 | A1 | 1/2003 | Wilmot et al. |
| 2003/0028550 | A1 | 2/2003 | Lee et al. |
| 2003/0074342 | A1 | 4/2003 | Curtis |
| 2003/0200527 | A1* | 10/2003 | Lynn et al. .................. 717/102 |
| 2004/0003353 | A1* | 1/2004 | Rivera et al. ................ 715/530 |
| 2004/0078373 | A1 | 4/2004 | Ghoneimy et al. |
| 2004/0083448 | A1* | 4/2004 | Schulz et al. ............... 717/101 |
| 2004/0172445 | A1 | 9/2004 | Singh et al. |
| 2004/0215662 | A1 | 10/2004 | Rangadass |
| 2005/0021877 | A1 | 1/2005 | Varpela et al. |
| 2005/0209841 | A1 | 9/2005 | Arning et al. |
| 2008/0092108 | A1* | 4/2008 | Corral ....................... 717/101 |

FOREIGN PATENT DOCUMENTS

| WO | 2004114061 | 12/2004 |
| WO | 2005001726 | 1/2005 |

OTHER PUBLICATIONS

"Oracle Workflow Developer's Guide", Release 2.6.3, Sep. 2003.*
"PL/SQL User's Guide and Reference", 10g Release 1 (10.1), Dec. 2003.*

(Continued)

*Primary Examiner*—Wei Y Zhen
*Assistant Examiner*—Anna Deng
(74) *Attorney, Agent, or Firm*—Konrad Raynes & Victor LLP; Janaki K. Davda

(57) ABSTRACT

Techniques are provided for processing a workflow. A workflow including one or more data management activities is received. A workflow description is generated from the workflow that includes a description of the one or more data management activities. One or more data management operations are generated from the workflow description. The one or more data management operations are executed against one or more data management systems.

12 Claims, 16 Drawing Sheets

OTHER PUBLICATIONS

Oracle "Oracle Wrokflow Developer's Guide" Release 2.6.3, Part No. B10284-02, Sep. 2003, pp. 1-622.*

Oracle "Oracle Wrokflow Developer's Guide" Release 2.6.3, Part No. B10285-02, Sep. 2003, pp. 1-136.*

Oracle "Oracle Wrokflow Administrator's Guide" Release 2.6.3, Part No. B10283-02, Sep. 2003, pp. 1-316.*

Abate et al, "Workflow Performance Evaluation though WPQL", Jul. 2002, ACM, SEKE'02, pp. 489-495.*

Jorgensen D. Havard, "Interaction as a Framework for Flexible Workflow Modelling", Sep. 2001, ACM, Group '01, pp. 32-41.*

Andrews, T., F. Curbera, H. Dholakia, Y. Goland, J. Klein, F. Leymann, K. Liu, D. Roller, D. Smith, S. Thatte, I. Trickovic, & S. Weerawarana, "Business Process Execution Language for Web Services", [online], Version 1.1, May 5, 2003, [Retrieved on Feb. 24, 2005], retrieved from the Internet at <URL: http://www.ibm.com/developerworks/library/specification/ws-bpel/>.

Advantys, "Advantys Announces the Release of WorkflowGen 3.0 (formerly eFormGen)", *Press Release*, [online], Sep. 23, 2003, retrieved from the Internet at <URL: www.workflowgen.com/home/liblocal/docs/pr/pr_en_name.pdf>.

Advantys, "Workflow Software- Integration", [online], [retrieved on Nov. 17, 2005], retrieved from the Internet at <URL: http://www.workflowgen.com/workflow/home/workflow_software_p335_EN_Y.htm>.

German Patent Application No. 04100395.5, filed Feb. 4, 2004, entitled "Dynamic Determination of Transaction Boundaries in Workflow Systems", invented by Arning, A., M. Kloppmann, F. Leymann, G. Pfau. D. Roller, A. Schmitz, F. Schwenkreis, & C. Zetner.

German Patent Application No. 04101174.3, filed Mar. 22, 2004, entitled "Optimization of Process Properties for Workflows with Failing Activities", invented by Pfau, G., A. Arning, C. Zentner, F. Leymann, F. Schwenkreis, M. Kloppmann, D. Roller, & A. Schmitz.

IBM Corporation, "BPELJ: BPEL for Java Technology", [online], Mar. 22, 2004, [Retrieved on Mar. 3, 2005], retrieved from the Internet at <URL: http://www-128.ibm.com/developerworks/webservices/library/ws-bpelj/>.

Kloppmann, M., D. Konig, F. Leymann, G. Pfau, & D. Roller, "Business Process Choreography in WebSphere: Combining the Power of BPEL and J2EE", *IBM Systems Journal*, vol. 43, No. 2, 2004, pp. 270-296.

Oasis Open, "Oasis Web Services Business Process Execution Language (WSBPEL) TC", [online], 2005, [Retrieved from on Mar. 3, 2005], retrieved from the Internet at <URL: http://www.oasis-open.org/committees/tc_home.php?wg_abbrev=wsbpel>.

U.S. Appl. No. 10/906,085, filed Feb. 2, 2005, entitled "Dynamic Determination of Transaction Boundaries in Workflow Systems", invented by Arning, A., M. Kloppmann, F. Leymann, G. Pfau. D. Roller, A. Schmitz, F. Schwenkreis, & C. Zetner.

Brambilla, M., S. Comai, M. Dario, P. Fraternali, and I. Manolescu, "Declarative Specification of Web Applications Exploiting Web Services and Workflows", Proceedings of the 2004 ACM SIGMOD International Conference on Management of Data, 2004, 2 pp.

Eilam, T., K. Appleby, J. Breh, G. Breiter, H. Daur, S.A. Fakhouri, G.D.H. Hunt, T. Lu, S.D. Miller, L.B. Mummert, J.A. Pershing, and H. Wagner, "Using a Utility Computing Framework to Develop Utility Systems", IBM Systems Journal, vol. 43, No. 1, 2004, pp. 97-120.

International Search Report and Written Opinion, Jul. 27, 2006, for International Application No. PCT/EP2006/060293, 12 pp.

* cited by examiner

```
<?xml version="1.0" encoding="UTF-8"?>
<process
    expressionLanguage="http://www.ibm.com/xmlns/prod/websphere/business-
process/expression-lang/java/v6.0/"
    name="Example1_Process" suppressJoinFailure="yes"
    targetNamespace="http://example1/Example1_Process/"
    wpc:autoDelete="no" wpc:businessRelevant="yes"
    wpc:compensationSphere="supports" wpc:displayName="Example1_Process"
    wpc:executionMode="microflow"
    xmlns="http://schemas.xmlsoap.org/ws/2003/03/business-process/"
    xmlns:wpc="http://www.ibm.com/xmlns/prod/websphere/business process/v5.1/"
    xmlns:wsdl="http://example1/Example1_Process/Interface0/"
    xmlns:wsdl0="http://tempuri.org/Example1_Interface"
    xmlns:wsdl1="http://tempuri.org/ii4bpel_VariableTypes_Interface"
    xmlns:wsdl2="http://tempuri.org/DMAVariableTypes_Interface"
    xmlns:wsdl3="http://tempuri.org/XSDVariableTypes_Interface"
    xmlns:xsi="http://www.w3.org/2001/XMLSchema-instance"
xsi:schemaLocation="http://schemas.xmlsoap.org/ws/2003/03/business-process/
http://schemas.xmlsoap.org/ws/2003/03/business-process/
http://www.ibm.com/xmlns/prod/websphere/business-process/v6.0/dma
http://www.ibm.com/xmlns/prod/websphere/business-
process/v6.0/dma/dataManagementActivity/dma.xsd">
    <wpc:customProperty name="InstanceDataSetup">
        <wpc:value>file:///mypath/myPIDSdocument.xml</wpc:value>
    </wpc:customProperty>
    <import importType="http://schemas.xmlsoap.org/wsdl/"
        location="../Example1_Interface.wsdl"
namespace="http://tempuri.org/Example1_Interface"/>
    <import importType="http://schemas.xmlsoap.org/wsdl/"
        location="Example1_ProcessInterface.wsdl"
namespace="http://example1/Example1_Process/Interface0/"/>
    <import importType="http://schemas.xmlsoap.org/wsdl/"
        location="../XSDVariableTypes_Interface.wsdl"
namespace="http://tempuri.org/ii4bpel_VariableTypes_Interface"/>
    <import importType="http://schemas.xmlsoap.org/wsdl/"
        location="../DMAVariableTypes_Interface.wsdl"
namespace="http://tempuri.org/DMAVariableTypes_Interface"/>
    <import importType="http://schemas.xmlsoap.org/wsdl/"
        location="../OrderItem_Interface.wsdl"
```

FIG. 6A

```
                                                              ┌── 610
namespace="http://tempuri.org/Example1_Interface"/>
    <partnerLinks>
        <partnerLink myRole="ProcessRole" name="PartnerLink"
partnerLinkType="wsdl:Example1_ProcessPartnerLinkType"/>
        <partnerLink name="ItemOrderLink"
            partnerLinkType="wsdl0:ItemOrderLinkPLT" partnerRole="OrderService"/>
    </partnerLinks>
    <variables>
        <variable messageType="wsdl0:Operation1_Request" name="InputVariable"/>
        <variable messageType="wsdl0:Operation1_Response" name="OutputVariable"/>
        <variable messageType="wsdl3:IntMessage" name="ItemCount"/>
        <variable messageType="wsdl2:SetReferenceMessage" name="SetReference"/>
        <variable messageType="wsdl2:DataSourceMessage" name="DataSource"/>
    </variables>
    <sequence name="Sequence" wpc:displayName="Sequence" wpc:id="1073741825">
        <receive createInstance="yes" name="Receive"
            operation="Operation1" partnerLink="PartnerLink"
            portType="wsdl0:Example1_Interface" variable="InputVariable"
            wpc:displayName="Receive" wpc:id="2"/>
        <flow name="Flow" wpc:displayName="Flow" wpc:id="7">
            <links>
                <link name="Link1"/>
            </links>
            <invoke name="CheckItemInStock" operation="null"
                partnerLink="null" portType="wpc:null"
                wpc:displayName="CheckItemInStock" wpc:id="6">
                <dataManagementActivity
                    xmlns="http://www.ibm.com/xmlns/prod/websphere/business-
process/v6.0/dma" xsi:type="tDataManagementActivity">
                    <statement xsi:type="tSqlStatement">
                        <dataSource part="myDataSource" variable="DataSource"/>
                        <body>
                                                    SELECT count(*) INTO <parameter
                                kind="out" property="myint"
                                variable="ItemCount"/>
                                                    FROM <setReference
                                cleanup="no" part="mySetReference"
                                preparation="no"
                                variable="SetReference"/>
                                                    WHERE itemid = <parameter
                                kind="in" property="itemid" variable="InputVariable"/>
                        </body>
                    </statement>
                </dataManagementActivity>
```

FIG. 6B

```
            <sources>
                <source linkName="Link1">
                    <transitionCondition
expressionLanguage="http://www.ibm.com/xmlns/prod/websphere/business-
process/expression-lang/java/v6.0/"><![CDATA[return ItemCount.get("myint") ==
0;]]></transitionCondition>
                </source>
            </sources>
        </invoke>
        <invoke inputVariable="InputVariable" name="OrderItem"
            operation="Order" outputVariable="OutputVariable"
            partnerLink="ItemOrderLink"
            portType="wsdl0:OrderItem_Interface"
            wpc:displayName="OrderItem" wpc:id="8">
            <targets>
                <target linkName="Link1"/>
            </targets>
        </invoke>
    </flow>
    <reply name="Reply" operation="Operation1"
        partnerLink="PartnerLink"
        portType="wsdl0:Example1_Interface"
        variable="OutputVariable" wpc:displayName="Reply" wpc:id="4"/>
    </sequence>
</process>
```

```xml
<?xml version="1.0" encoding="UTF-8"?>
<process expressionLanguage="http://www.ibm.com/xmlns/prod/websphere/business-
process/expression-lang/java/v6.0/" name="Example2_Process"
suppressJoinFailure="yes" targetNamespace="http://example2/Example2_Process/"
wpc:autoDelete="no" wpc:businessRelevant="yes" wpc:compensationSphere="supports"
wpc:displayName="Example2_Process" wpc:executionMode="microflow"
xmlns="http://schemas.xmlsoap.org/ws/2003/03/business-process/"
xmlns:wpc="http://www.ibm.com/xmlns/prod/websphere/business-process/v5.1/"
xmlns:wsdl="http://example2/Example2_Process/Interface0/"
xmlns:wsdl0="http://tempuri.org/Example2_Interface"
xmlns:wsdl1="http://tempuri.org/DMAVariableTypes_Interface"
        xmlns:xsi="http://www.w3.org/2001/XMLSchema-instance"
xsi:schemaLocation="http://schemas.xmlsoap.org/ws/2003/03/business-process/
http://schemas.xmlsoap.org/ws/2003/03/business-process/
http://www.ibm.com/xmlns/prod/websphere/business-process/v6.0/dma
http://www.ibm.com/xmlns/prod/websphere/business-
process/v6.0/dma/dataManagementActivity/dma.xsd">
        <import importType="http://schemas.xmlsoap.org/wsdl/"
location="../Example2_Interface.wsdl"
namespace="http://tempuri.org/Example2_Interface" />
        <import importType="http://schemas.xmlsoap.org/wsdl/"
location="Example2_ProcessInterface.wsdl"
namespace="http://example2/Example2_Process/Interface0/" />
        <import importType="http://schemas.xmlsoap.org/wsdl/"
location="../DMAVariableTypes_Interface.wsdl"
namespace="http://tempuri.org/DMAVariableTypes_Interface" />
        <partnerLinks>
                <partnerLink myRole="ProcessRole" name="PartnerLink"
partnerLinkType="wsdl:Example2_ProcessPartnerLinkType" />
        </partnerLinks>
        <variables>
                <variable messageType="wsdl0:Operation1_Request"
name="InputVariable" />
                <variable messageType="wsdl0:Operation1_Response"
name="OutputVariable" />
                <variable messageType="wsdl1:DataSourceMessage"
name="DataSource" />
                <variable messageType="wsdl1:SetReferenceMessage"
name="SetReference_OrdersEurope" />
                <variable messageType="wsdl1:SetReferenceMessage"
name="SetReference_OrdersUS" />
                <variable messageType="wsdl1:SetReferenceMessage"
```

FIG. 9A

```
                                                          910
   name="ResultSetReference_Europe" />
         <variable messageType="wsdl1:SetReferenceMessage"
name="ResultSetReference_US" />
         <variable messageType="wsdl1:SetReferenceMessage"
name="ResultSetReference_Union" />
         <variable messageType="wsdl1:MaterializationMessage"
name="MaterializedOrders" />
      </variables>
      <sequence name="Sequence" wpc:displayName="Sequence"
wpc:id="1073741825">
         <receive createInstance="yes" name="Receive" operation="Operation1"
partnerLink="PartnerLink" portType="wsdl0:Example2_Interface"
variable="InputVariable" wpc:displayName="Receive" wpc:id="2" />
         <flow name="Flow" wpc:displayName="Flow" wpc:id="6">
            <links>
               <link name="Link1" />
               <link name="Link2" />
               <link name="Link3" />
            </links>
            <invoke name="GetEuropeanOrders" operation="null"
partnerLink="null" portType="wpc:null" wpc:displayName="GetEuropeanOrders"
wpc:id="7">
               <dataManagementActivity
xmlns="http://www.ibm.com/xmlns/prod/websphere/business-process/v6.0/dma"
xsi:type="tDataManagementActivity">
                  <statement xsi:type="tSqlStatement">
                     <dataSource variable="DataSourceVariable"
part="myDataSource" />
                     <resultSetReference
variable="ResultSetReference_Europe" part="mySetReference" preparation="ifNeeded"
cleanup="yes" cleanupScope="instance" />
                     <body>
                        SELECT OID, CID, TYPE,
TOTPRICE, DATE FROM
                        <setReference
variable="SetReference_OrdersEurope" part="mySetReference" preparation="no"
cleanup="no" />
                     </body>
                  </statement>
                  <statement xsi:type="tSqlStatement">
                     <dataSource part="myDataSource"
variable="DataSourceVariable" />
                     <body>
```

FIG. 9B

```
                                                    UPDATE
                                    <setReference
variable="ResultSetReference_Europe" part="mySetReference" preparation="no"
cleanup="no" />
                                    SET TOTPRICE =
BO.EURO_TO_DOLLAR(TOTPRICE)
                                            </body>
                                        </statement>
                                    </dataManagementActivity>
                                    <sources>
                                        <source linkName="Link1" />
                                    </sources>
                                </invoke>
                                <invoke name="GetUSOrders" operation="null"
partnerLink="null" portType="wpc:null" wpc:displayName="GetUSOrders"
wpc:id="8">
                                    <dataManagementActivity
xmlns="http://www.ibm.com/xmlns/prod/websphere/business-process/v6.0/dma"
xsi:type="tDataManagementActivity">
                                        <statement xsi:type="tSqlStatement">
                                            <dataSource part="myDataSource"
variable="DataSourceVariable" />
                                            <resultSetReference
variable="ResultSetReference_US" part="mySetReference" preparation="ifNeeded"
cleanup="yes" cleanupScope="instance" />
                                            <body>
                                    SELECT OID, CID, TYPE,
TOTPRICE, DATE FROM
                                    <setReference
variable="SetReference_OrdersUS" part="mySetReference" preparation="no"
cleanup="no" />
                                            </body>
                                        </statement>
                                    </dataManagementActivity>
                                    <sources>
                                        <source linkName="Link2" />
                                    </sources>
                                </invoke>
                                <invoke name="UnionOrders" operation="null"
partnerLink="null" portType="wpc:null" wpc:displayName="UnionOrders" wpc:id="9">
                                    <dataManagementActivity
xmlns="http://www.ibm.com/xmlns/prod/websphere/business-process/v6.0/dma"
xsi:type="tDataManagementActivity">
```

FIG. 9C

```xml
                    <statement xsi:type="tSqlStatement">
                        <dataSource part="myDataSource" variable="DataSourceVariable" />
                        <resultSetReference cleanup="no" part="mySetReference" preparation="ifNeeded" variable="ResultSetReference_Union" />
                        <body>
                            SELECT OID, CID,TYPE, TOTPRICE, DATE FROM
                            <setReference cleanup="no" part="mySetReference" preparation="no" variable="ResultSetReference_Europe" />
                            UNION ALL SELECT OID, CID, TYPE, TOTPRICE, DATE FROM
                            <setReference cleanup="no" part="mySetReference" preparation="no" variable="ResultSetReference_US" />
                        </body>
                    </statement>
                </dataManagementActivity>
                <targets>
                    <target linkName="Link1" />
                    <target linkName="Link2" />
                </targets>
                <sources>
                    <source linkName="Link3" />
                </sources>
            </invoke>
            <invoke name="MaterializeOrders" operation="null" partnerLink="null" portType="wpc:null" wpc:displayName="MaterializeOrders" wpc:id="10">
                <dataManagementActivity xmlns="http://www.ibm.com/xmlns/prod/websphere/business-process/v6.0/dma" xsi:type="tDataManagementActivity">
                    <statement xsi:type="tMaterializationStatement">
                        <from part="mySetReference" variable="ResultSetReference_Union" />
                        <to part="myMaterializationResult" variable="MaterializedOrders" />
                    </statement>
                </dataManagementActivity>
                <targets>
                    <target linkName="Link3" />
                </targets>
            </invoke>
        </flow>
```

```
<assign name="Assign1" wpc:displayName="Assign1" wpc:id="11">
          <copy>
               <from part="myMaterializationResult" variable="MaterializedOrders">
                    <query queryLanguage="http://www.w3.org/TR/1999/REC-xpath-19991116" />
               </from>
               <to part="myMaterializationResult" variable="OutputVariable" />
          </copy>
     </assign>
     <reply name="Reply" operation="Operation1" partnerLink="PartnerLink" portType="wsdl0:Example2_Interface" variable="OutputVariable" wpc:displayName="Reply" wpc:id="4" />
   </sequence>
</process>
```

FIG. 9E

INTEGRATION OF DATA MANAGEMENT OPERATIONS INTO A WORKFLOW SYSTEM

BACKGROUND

1. Field

Embodiments of the invention relate to integration of data management operations into a workflow system.

2. Description of the Related Art

Workflow management systems (WFMSs) support the modeling and execution of business processes and may also be referred to as "workflow systems". Business processes specify which piece of work of a network of pieces of work is carried out in which sequence and which resources are exploited to carry out the pieces of work. Individual pieces of work may be distributed across a multitude of different computer systems connected by some type of network.

A powerful and sophisticated workflow management system, such as the product IBM® MQSeries® Workflow (available from International Business Machines Corporation) supports the modeling of business processes as a network of activities. This network of activities, the process model, is constructed using a directed, acyclic, weighted, colored graph as a meta model. The nodes of the graph represent the activities, which define individual tasks that are to be carried out. Any other meta model, such as a hierarchical meta model, may be used for constructing process models. In general, each of the activities is associated with a piece of code that implements the appropriate task for that activity. The edges of the graph, the control links, describe a potential sequence of execution of the activities. Control links are represented as arrows; the head of the arrow describes the direction in which the flow of control is moving through the process.

The activity where the control link starts is called the source activity and the activity where the control link ends is called the target activity. An activity may be source and target activities for different control links. Activities that have no incoming control link are called start activities, as they start the process. Activities that have no outgoing control link are called end activities, as after their completion the process has ended. An activity may be a start activity as well as an end activity. An activity that has multiple outgoing control links is called a fork activity; an activity with multiple control links is called a join activity.

Different workflow languages are available, and Business Process Execution Language (BPEL) is one such workflow language. BPEL may be described as an XML-based language that allows task-sharing for a distributed computing environment using a combination of Web services. The term "BPEL" is sometimes also used to refer to other versions of the language, such as, Business Process Execution Language for Web Services (BPEL4WS) or BPELWS. BPEL may also be described as a standard for describing and choreographing business process activities. WebSphere® Business Integration (WBI) products (available from International Business Machines Corporation) provide an implementation for designing and executing BPEL based business processes. A component of WBI is named WebSphere® Process Choreographer (WPC) workflow system.

The term Web is used to refer to the World Wide Web, which may be described as a group of Internet servers that support documents formatted in HyperText Markup Language (HTML). A Web service (also referred to as an "application service") may be described as a service made available from a Web server that is typically invoked by a program connected to the Web.

BPEL4WS defines a notation for specifying business process behavior based on Web services. (Business Process Execution Language for Web Services Specification, Version 1.1, dated May 5, 2003, hereinafter "BPEL4WS specification") The BPEL4WS specification indicates that business processes may be described as executable business processes that model actual behavior of a participant in a business interaction or as business protocols that use process descriptions that specify mutually visible message exchange behavior of each of the parties involved in the protocol, without revealing their internal behavior.

According to the BPEL4WS specification, BPEL4WS provides a language for the formal specification of business processes and business interaction protocols and defines an interoperable integration model that facilitates the expansion of automated process integration in both the intra-corporate and the business-to-business spaces. Also, the BPEL4WS specification defines activities that are supported.

Access to a data management system from within a workflow system is unnecessarily complex in conventional workflow systems. Conventional workflow systems offer one or both of the following approaches:

1. A data management operation has to be coded in a traditional programming language, for example, by writing some Java® code and exploiting Application Programming Interfaces (APIs) offered by the data management system.

2. The data management operation has to be provided via a Web service.

The WPC workflow system, for example, supports both approaches. The WPC workflow system allows implementing process activities via Java® code and allows using Web services as process activities.

When using the first approach, a WPC user has to code a Java® activity. The user has to have Java® development knowledge in addition to knowledge about Structured Query Language (SQL) and the Java® Database Connectivity (JDBC) API that allows the user to issue SQL statements from within a Java® environment. The SQL statement itself fits into a single line of code. However, issuing the SQL statement (a type of "query") via JDBC, getting an input parameter out of a WPC workflow system variable, feeding the input parameter into the query, and writing the result of the query into a WPC workflow system variable requires a large amount of code to be written and a large amount of time to perform the coding.

When using the second approach, a WPC workflow system user has to code the SQL statement and wrap the SQL statement into a Web service. Many steps and different products may be necessary to achieve this. Independent of how the user constructed the Web service, two additional activities ("assign" activities) may also need to be added to the business process to provide the Web service with the input needed and to deal with the results.

Both approaches are cumbersome to users, though accessing a data management system is a typical activity for a business process.

Moreover, workflows, such as those represented by BPEL, express a sequence of processing activities. Most commonly, these activities operate over a single record of data at a time. However, in an increasing number of scenarios, it is preferable to operate over sets of records (also referred to as "sets"), rather than one record at a time. This pattern is similar to an Extract Transform Load (ETL) pattern used in Data Warehousing applications to process data. With ETL, a set of records is retrieved ("extracted") from a database, processed ("transformed"), and loaded into a database.

Thus, it is useful to use a workflow engine to intermix some set-oriented operations with the record-oriented operations. Most often, these set activities are really processing of information from one or more data sources (e.g., relational databases). For instance, an activity may retrieve or update information from one or more data sources as part of a database query. In conventional workflow systems, to perform a sequence of such activities, the workflow engine normally has to materialize the full set of data (i.e., retrieve all of the information from the one or more data sources) and then pass this set of data to another activity by copying the data, which performs its processing and passes the set of data to yet another activity, etc. Thus, the full set of data is copied and passed between data activities. Passing large sets by copy is not acceptable for performance reasons because it is in-efficient and is difficult to develop.

Conventional business process runtime systems have some weaknesses with respect to designing and executing data management operations. For example, conventional business process runtime systems assume a static environment, where the sets (e.g., tables) that the data management activities should go against are already known before running the business process (i.e., they are either specified at design or at deployment time).

Although for some applications, it is acceptable to assume a static data management environment, such an assumption may not be applicable for dynamic, on-demand application scenarios, where choosing the data of interest may depend on, for example, Service Level Agreements. In an on-demand application scenario, there may be data management environments in which data is stored redundantly in several places with different Quality of Service characteristics. The on-demand application may need to choose a different data source for different users, depending on the Service Level Agreements as contracted with the respective user. Choosing a data source may, for example, depend on access time, availability and/or staleness characteristics of the respective data sources.

Thus, many on demand applications would benefit from a workflow system that directly enables postponing the decisions about which data sources to use at runtime.

Therefore, there is a need in the art for integrating data management operations with a workflow system.

SUMMARY OF THE INVENTION

Provided are a method, article of manufacture, and system for processing a workflow. A workflow including one or more data management activities is received. A workflow description is generated from the workflow that includes a description of the one or more data management activities. One or more data management operations are generated from the workflow description. The one or more data management operations are executed against one or more data management systems.

BRIEF DESCRIPTION OF THE DRAWINGS

Referring now to the drawings in which like reference numbers represent corresponding parts throughout:

FIGS. 6A, 6B, and 6C provide sample pseudocode for a workflow in accordance with certain embodiments.

FIGS. 9A, 9B, 9C, 9D, and 9E provide sample pseudocode for a workflow in accordance with certain embodiments.

DETAILED DESCRIPTION

In the following description, reference is made to the accompanying drawings which form a part hereof and which illustrate several embodiments. It is understood that other embodiments may be utilized and structural and operational changes may be made without departing from the scope of the invention.

Figure 1:
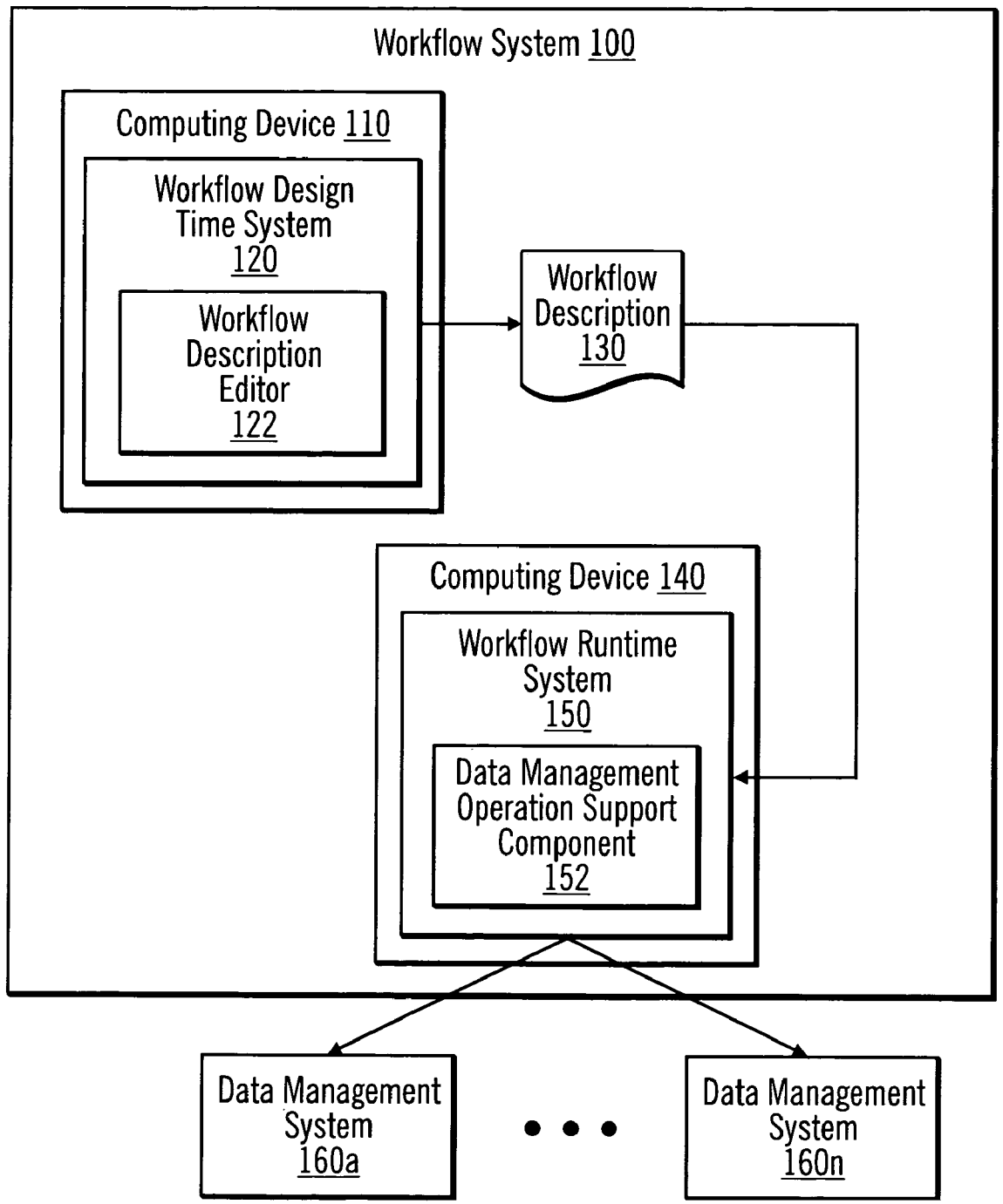
FIG. 1 illustrates details of a computer architecture in which certain embodiments may be implemented.

FIG. 1 illustrates details of a workflow system 100 in which certain embodiments may be implemented. A computing device 110 includes a workflow design time system 120 for enabling users to create a graphic representation of a workflow (e.g., 310 of FIG. 3). The workflow design time system 120 includes a workflow description editor 122 that generates a workflow description 130 from the graphic representation of the workflow. The workflow description 130 is routed to computing device 140, which includes a workflow runtime system 150. The workflow runtime system 150 is able to execute the workflow description 130. The workflow runtime system 150 includes data management operation support component 152, which is used to process data management operations integrated into the workflow description 130. The data management operations are submitted against one or more data management systems 160a . . . 160n (where the ellipses indicate that there can be any number of data management systems in addition to data management systems 160a and 160n). A data management system 160a . . . 160n may be described as a computing device that provides access to data (e.g., a server computer).

The term activity refers to "nodes" of a workflow (e.g. CheckItemInStock 320 of FIG. 3), while the term "operation" refers to statements that are executed against a data management system 160a . . . 160n (i.e., the statements in which input parameters and input set references have been replaced by corresponding values). The execution of an activity may involve several operations.

Figure 2:
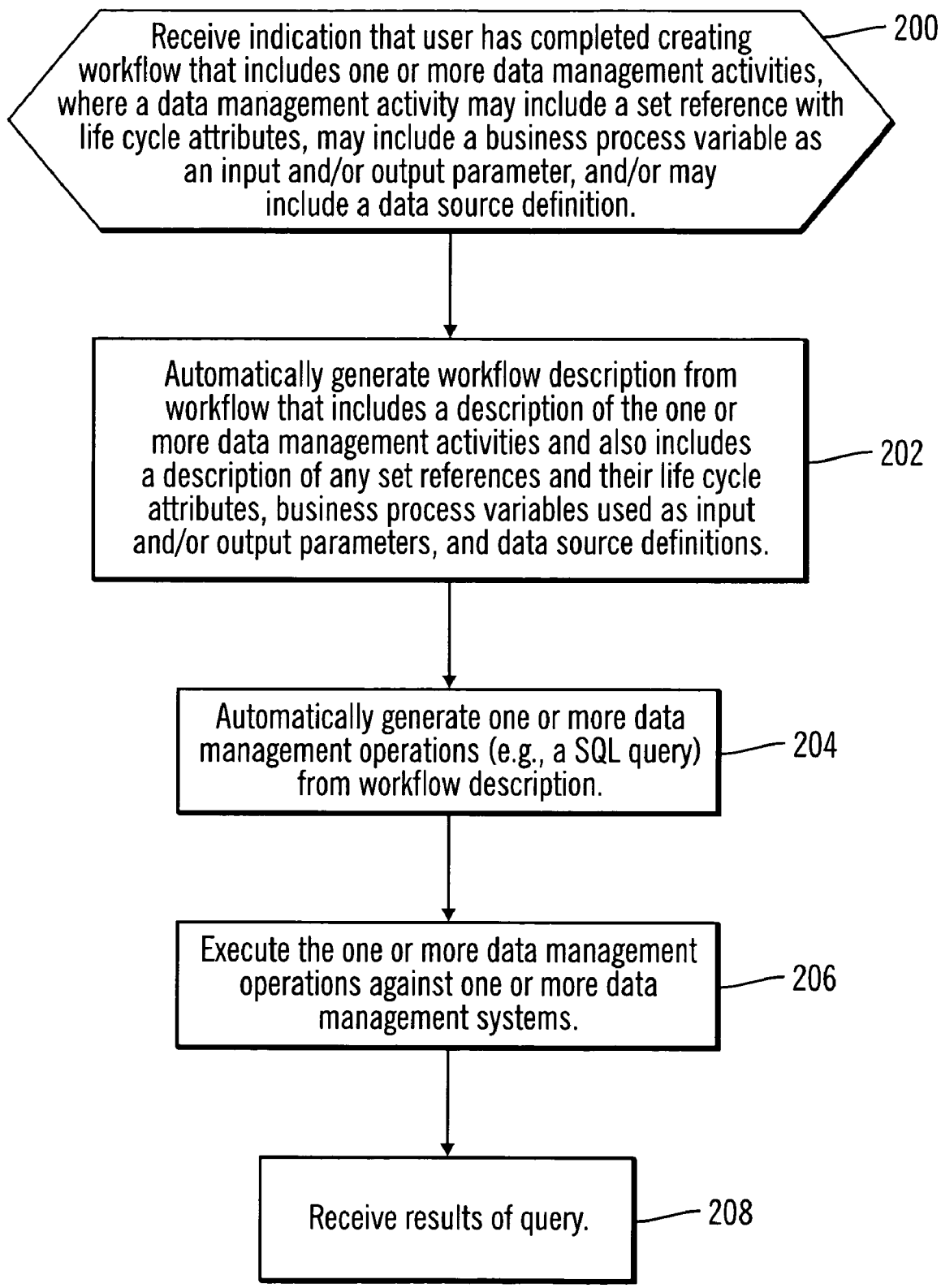
FIG. 2 illustrates logic for integrating data management operations into a workflow system in accordance with certain embodiments.

FIG. 2 illustrates logic for integrating data management operations into a workflow system in accordance with certain embodiments. Control begins at block 200 with the workflow design time system 120 receiving an indication that a user has completed creating a workflow (also referred to as a "control flow") that includes one or more data management activities provided by embodiments. In particular, embodiments provide a new group of data management activities as an extension to workflow languages (e.g., BPEL). The data management activities allow access to and management of data management systems 160a . . . 160n (e.g., relational database systems) from within the workflow system.

The data management activities may operate on sets, and to enable this, embodiments provide set references with life cycle attributes. Thus, a data management activity may include a set reference with life cycle attributes. A set reference may be described as an indicator (e.g., pointer) to a set of data that resides in a data management system (rather than in a business process). The set reference contains information needed to access the data management system and to manage the corresponding set. By using set references, embodiments avoid passing large sets of information between activities. Also, embodiments provide life cycle management support for sets by allowing users to select life cycle attributes that determine, for example, how long a set may be available for use and when the set is to be discarded.

The data management activities include, for example, Structured Query Language (SQL) activities, materialization activities, and system command activities. Examples of the SQL activities include: select, select into, call, insert, update, delete, merge, values, values into, and Data Definition Language (DDL) operations. The DDL operations include, for example, create, alter, drop, refresh, revoke, grant, and set. The materialization activities make the content of a set reference available to the workflow system (e.g., as XML documents). Examples of system command activities include: start data management system, stop data management system, backup, restore, reorganize, and runstats.

Additionally, embodiments provide an extensibility mechanism that allows users to add new activity types. Also, each activity type may map to one or more operations of a data management system. For example, a new activity may be "Load data from remote system", and execution of this new activity results in several operations executed at a data management system (e.g., several create operations followed by a select operation).

Moreover, embodiments allow business process variables to be used as input and/or output parameters for the data management activities. Business process variables may be described as workflow language variables (e.g., BPEL variables).

Furthermore, embodiments allow data source definitions that enable selection of a data source at run time.

Existing workflow languages do not include such data management operations, set references, or life cycle management for set references. Moreover, existing workflow languages do not provide the expanded use of business process variables as parameters for activities, as provided by embodiments (i.e., existing workflow languages often have restrictions for using business process variables (e.g., a Web service activity in BPEL can only have a single variable as input and a single variable as output). Also existing workflow languages do not enable data source selection at runtime.

By providing new data management activities and enabling creation of additional activities, embodiments integrate data management operations into a workflow system, such that the data management operations are easily invoked and enable sharing of information in the form of sets between data management systems and the workflow system.

Moreover, by extending a workflow language to include data management activities and providing set references that reference sets of data without requiring the data to be materialized, embodiments enable mixing of record oriented and set oriented activities within a single workflow. Also, embodiments enable data management activities to be specified "inline" as part of a workflow description (e.g., as SQL statements within the workflow description).

Returning to FIG. 2, in block 202, the workflow description editor 122 automatically generates a workflow description from the workflow. The workflow description includes a description of the one or more data management activities. If selected, the workflow description also includes a description of any set references and their life cycle attributes, business process variables used as input and/or output parameters, and data source definitions.

In block 204, the workflow runtime system 150 automatically generates one or more data management operations (e.g., one or more SQL queries) from the workflow description. In block 206, the workflow runtime system 150 executes the one or more data management operations against the one or more data management systems 160a . . . 160n. In certain embodiments, an activity is submitted against a single data management system 160a . . . 160n, while different data management operations may be executed against different data management systems 160a . . . 160n depending on the data source definition(s) attached to the activity. In block 208, the results of the query are returned to the workflow runtime system 150.

Merely to enhance understanding of the invention, examples herein may refer to the integration of SQL operations into a BPEL based workflow system. In certain embodiments, SQL operations are integrated into a WebSphere® Process Choreographer (WPC) workflow system.

The techniques of embodiments may be extended to cover other types of data management operations and other types of sets and data management systems (e.g., XML database systems and content management systems). Also, the techniques may be extended to XQuery (which is an Extensible Markup Language (XML) query language) and collections of XML documents stored in an XML database system and to content access and manipulation operations and sets of documents stored in a document management system. With respect to the workflow system, the techniques of embodiments may be extended to other service oriented workflow systems not based on BPEL. That is, the techniques of embodiments may be used with any workflow language (e.g., Forms Definition Markup Language (FDML) or XLANG (a specification from Microsoft Corporation)).

Figure 3:
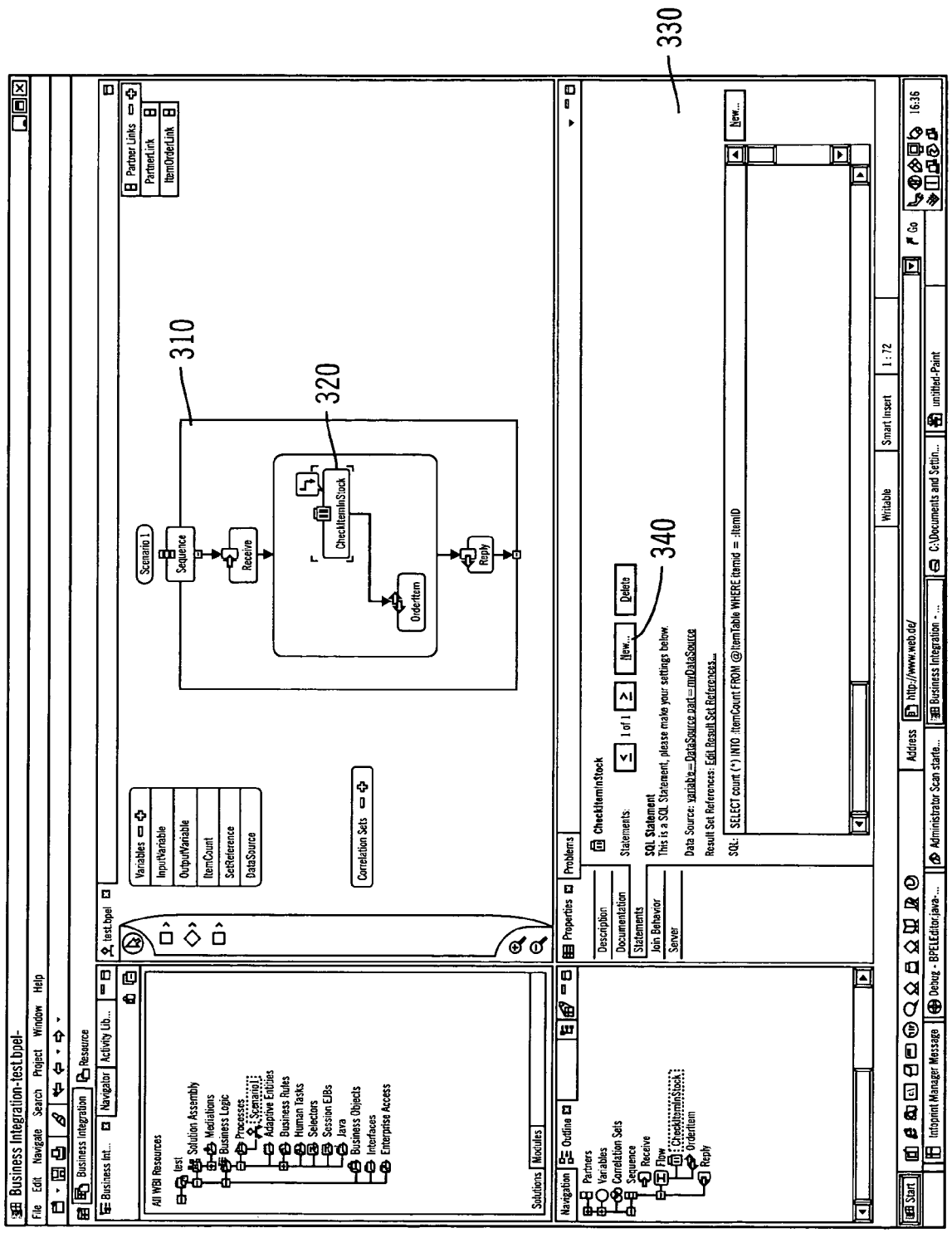
FIG. 3 illustrates a display provided by a workflow design time system in accordance with certain embodiments.

FIG. 3 illustrates a display provided by a workflow design time system 120 in accordance with certain embodiments. A user is able to create a graphic representation of a workflow 310. In FIG. 3, the workflow 310 includes a "CheckItemInStock" data management activity 320 that checks the availability of a given item in stock. In the workflow 310, if there is no item left in stock, which is checked with a transition condition, a Web service is called to order a new item. The workflow 310 returns the output of the Web service if the item is not in stock or a default value if the item is in stock.

Pane 330 illustrates a SQL statement that is built using the workflow design time system 120 that allows a user to directly specify a SQL statement, which is part of the workflow description 130. The ItemCount and itemid links point to input/output parameters, respectively, which are linked to business process variables. The ItemTable link points to an input set reference. When a user selects (e.g., clicks on) these links, a wizard is provided by embodiments of the workflow design time system 120 to update the parameters or the set references, respectively. New parameters and set references may be created by selecting the "new" button 340. That is, new parameters and set references (e.g., input or output set references) may be mapped to business process variables (e.g., BPEL variables and/or properties). Also, the variable=DataSource part=myDataSource statement indicates that the data source for the SQL statement is identified by the "myDataSource" part of the business process variable "DataSource".

Figure 4:
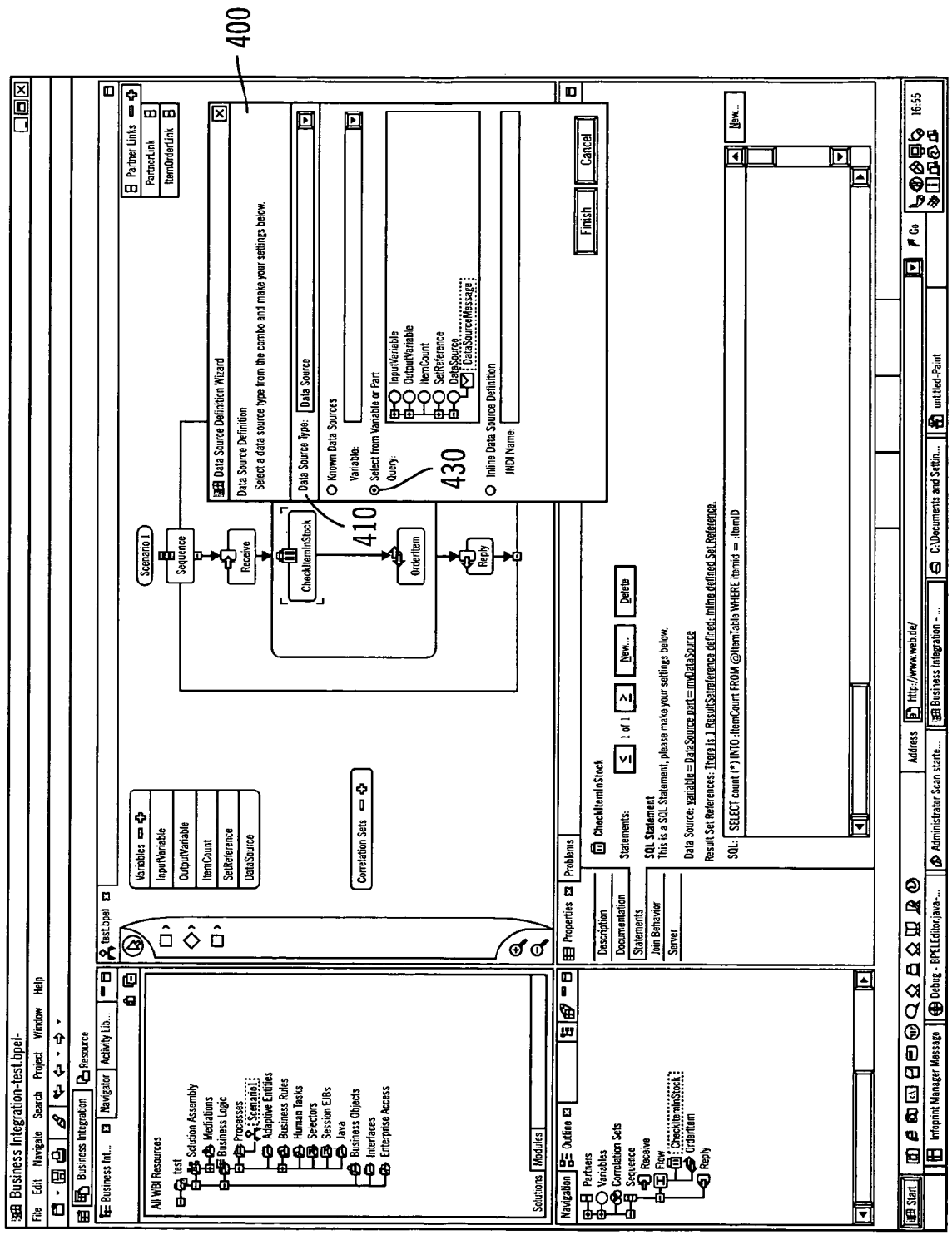
FIG. 4 illustrates a Data Source Definition Wizard in accordance with certain embodiments.

To specify a particular data source to be used by the "CheckItemInStock" data management activity 320, a user selects the "CheckItemInStock" data management activity 320 and selects a "define data source button", which results in a Data Source Definition Wizard 400 being displayed (FIG. 4). A user may then provide a data source type 410 (e.g., by specifying a mapping to a business process variable or to a part of a business process variable 430). The user may alternatively provide inline a data source definition. Thus, a data source for an SQL activity may be specified by mapping the data source to a business process variable (e.g., a BPEL variable) or to part of a business process variable (e.g., a part of a BPEL variable).

Figure 5:
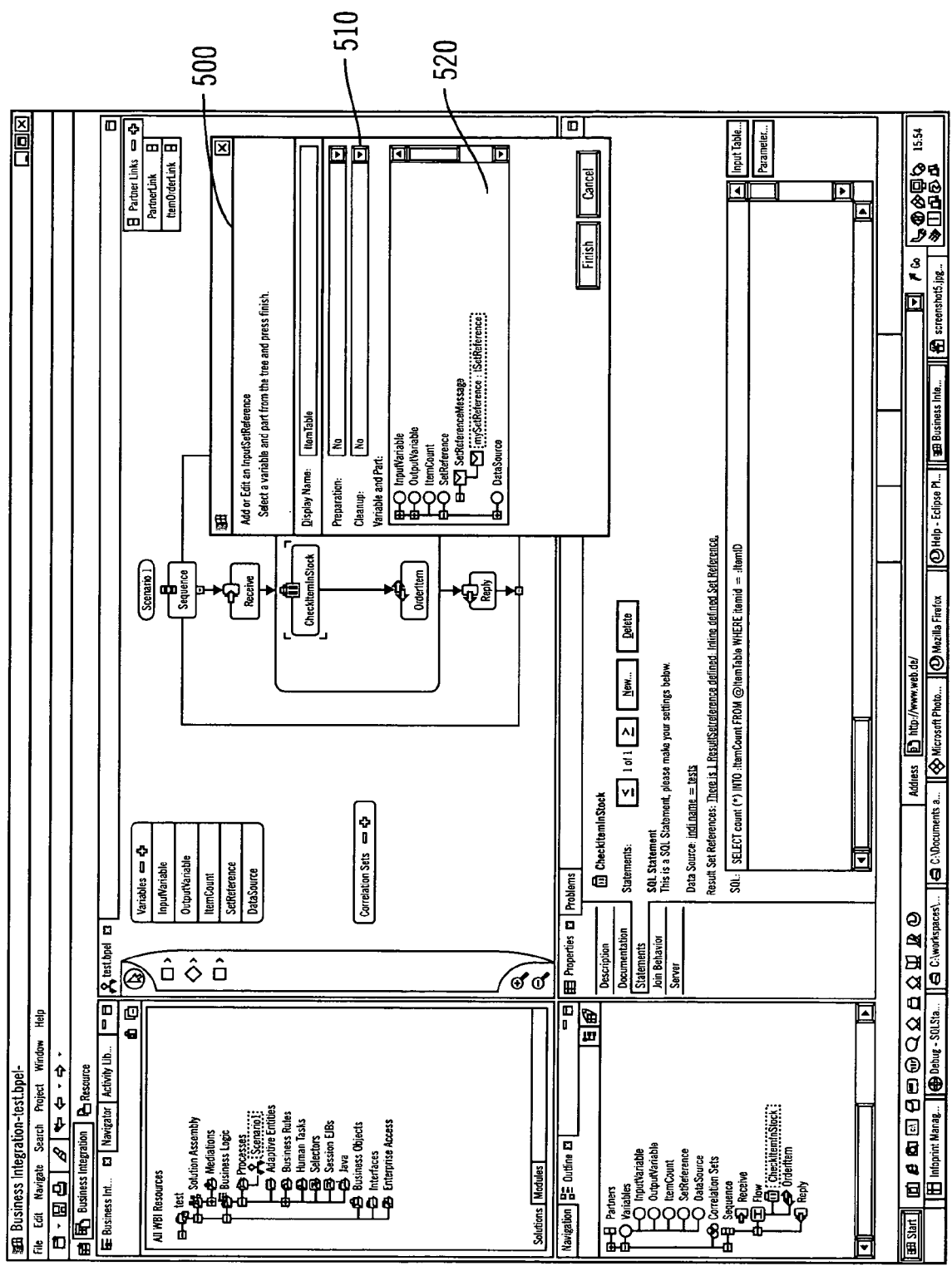
FIG. 5 illustrates an Add or Edit an InputSetReference screen in accordance with certain embodiments.

Also, embodiments enable mapping of input set references to business process variables (e.g., BPEL variables) or to parts of business process variables (e.g., a parts of BPEL variables). FIG. 5 illustrates an Add or Edit An InputSetReference screen 500, in accordance with certain embodiments, which enables the mapping to a business process variable and part 520. To specify an input set reference and life cycle attributes to be used by the "CheckItemInStock" data management activity 320, a user selects the "CheckItemInStock" data management activity 320 and selects the "new" button 340, which results in display of the Add or Edit an InputSetReference screen 500. In the set Add or Edit an InputSetReference screen 500, a user identifies a business process variable and part 520 and identifies life cycle attributes, such as whether cleanup 510 is required and at which point in time the cleanup should be performed.

The "CheckItemInStock" data management activity is specified using inline SQL in a workflow description. The following sample Pseudocode A illustrates the workflow description for "CheckItemInStock" data management activity.

Pseudocode A

```
<invoke name="CheckItemInStock" operation="null" partnerLink="null"
portType="wpc:null" wpc:displayName="CheckItemInStock"
wpc:id="6">
    <dataManagementActivity xsi:type="tDataManagementActivity">
        <statement xsi:type="tSqlStatement">
            <dataSource part="myDataSource"
            variable="DataSource"/>
            <body>
                SELECT count(*) INTO
                    <parameter kind="out" property="myint"
                variable="ItemCount" />
                FROM
                    <setReference cleanup="no" part="mySetReference"
                preparation="no" variable="SetReference" />
                WHERE itemid =
                    <parameter kind="in" property="itemid"
                variable="InputVariable" />
            </body>
        </statement>
    </dataManagementActivity>
    <sources>
        <source linkName="Link1">
            <transitionCondition
expressionLanguage="http://www.ibm.com/xmlns/prod/Websphere/
business-process/expression-lang/java/v6.0/">
                <![CDATA[return ItemCount.get("myint") == 0;]]>
            </transitionCondition>
        </source>
    </sources>
</invoke>
```

In Pseudocode A, the data management activity statement element ("dataManagementActivity") contains a data source definition element ("dataSource") and a body element ("body").

The data source definition element refers to a BPEL variable ("myDataSource") containing the actual data source definition.

The SQL defined in the body element of the statement is executed against the data source identified by the data source definition element. In particular, the body element defines a SQL "SELECT INTO" statement. The SQL tokens are mixed with setReference and parameter elements. The setReference element refers to the BPEL variable "SetReference" containing the set reference definition that is used to determine the actual database table. The input parameter refers to the BPEL variable "InputVariable" containing the itemid to be used in the where clause of the SQL statement. The result of the statement is stored in variable "ItemCount" as defined by an output parameter. Moreover, the set reference has life cycle options of cleanup="no" and preparation="no", which indicates that no preparation is needed to use the set reference and the corresponding set is not deleted. The transition condition of "ItemCount.get("myint")==0" checks if the Web service needs to be called by checking the result of the "CheckItemInStock" data management activity.

The workflow runtime system 150 generates a data management operation (e.g., a SQL query) from Pseudocode A, which may then be executed against the data management systems 160a . . . 160n. The data management operation that is generated for execution depends on the values for any input parameters and input set references.

In particular, executing the "CheckItemInStock" activity in the workflow runtime system 150 includes the data management operation support component 152 receiving the workflow description of this activity, as well as, the context of the process. The context includes the BPEL variables and properties. The data management operation support component 152 first checks for input parameters and for input set reference variables and obtains the corresponding values out of the BPEL variables specified. For example, the item id is extracted from the BPEL variable "InputVariable". In this example, assume that the value of the integer is 135. The name of the table used in the select query is extracted from the part "mySetReference" of the BPEL variable "SetReference". In this example, assume that the name of the table is "ITEMS".

The data management operation support component 152 determines the data source the query should be executed against. In this example, the data source is specified by the contents of the part "myDataSource" of the BPEL variable "DataSource". For this example, assume that the value is the jndi name "jdbc/sample". The data management operation support component 152 creates a connection with the data source "jdbc/sample" and executes an SQL statement in which input parameters and input set references are replaced by the values extracted from the BPEL variables. The following is an example query that is generated:

SELECT COUNT(*) INTO :OUTPUTPARAMETER1 FROM "ITEMS" WHERE ITEMID = 135

The data management operation support component 152 writes the value of "OUTPUTPARAMETER1" into the BPEL variable "ItemCount".

For ease of understanding, another example of executing the first statement of the "GetEuropeanOrders" activity in the workflow runtime system 140 that is simplified is provided. In this example, the data management operation support component 152 in the workflow runtime system 150 receives the description of the activity as well as the context of the process. This context includes the BPEL variables and properties.

The data management operation support component 152 first checks for input parameters and for input set variables. In this example, there is an input set reference. The name of the table used in the select query is extracted from the part "mySetReference" of the BPEL variable "SetReference_OrdersEurope". For this example, assume that the name of the table is "INPUT.EUROPEANORDERS".

The data management operation support component 152 determines the data source the query should be executed against. In this example, the data source is specified by the contents of the part "myDataSource" of the BPEL variable "DataSourceVariable". For this example, assume that the value is the jndi name "jdbc/sample". The data management operation support component 152 creates a connection with the data source "jdbc/sample" and executes the SQL statement:

```
SELECT OID, CID, TYPE, TOTPRICE, DATE FROM
"INPUT.EUROPEANORDERS" WHERE ITEMID = 135
```

There is a result set reference specified. Thus, the data management operation support component 152 writes the result of this query into the table specified by the part "mySetReference" of variable "ResultSetReference_Europe". A life cycle management option is specified for this table. The table is to be deleted from the data management system at the end of the life time of the current process. The data management operation support component 152 stores this information persistently. At the end of the execution of the process the data management operation support component 152 is called by the workflow runtime system 150 to perform cleanup work.

FIGS. 6A, 6B, and 6C provide sample pseudocode 600, 610, 620 for the workflow 610 in accordance with certain embodiments. Pseudocode A is part of the illustrated pseudocode 600, 610, 620.

Figure 7:
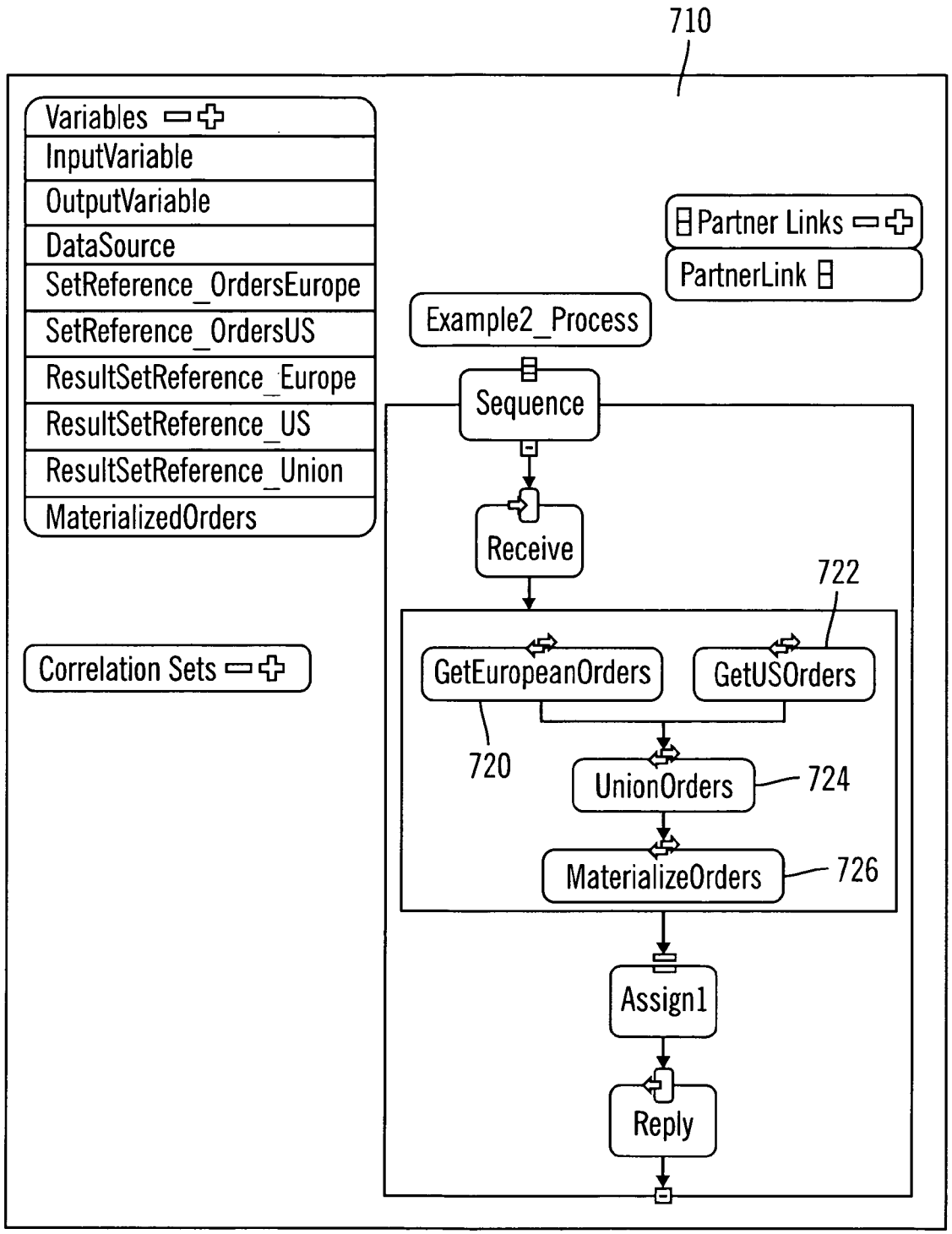
FIG. 7 illustrates a display provided by a workflow design time system in accordance with certain embodiments.

FIG. 7 illustrates a display provided by a workflow design time system 120 in accordance with certain embodiments. A user is able to create a graphic representation of a workflow 710. In FIG. 7, the workflow 710 includes "GetEuropeanOrders" 720, "GetUSOrders" 722, "UnionOrders" 724, and "MaterializeOrders" 726 data management activities. In FIG. 7, the workflow loads order data from two different geographical regions (Europe and the US). Before the two data streams are joined together, a currency conversion is made (Euro to Dollar). After the join of the two data sets the resulting data is materialized into an XML document. Finally the XML document is returned as output of the workflow.

The following sample Pseudocode B illustrates the workflow description for the GetEuropeanOrders data management activity 720. The GetEuropeanOrders data management activity 720 loads European data into a set reference stored in a BPEL variable ResultSetReference_Europe (statement 1), and then performs a currency conversion from Euro to Dollar (statement 2). The conversion is done via an SQL UPDATE statement. The set reference BPEL variable ResultSetReference_Europe is taken as an input set reference for the conversion statement.

Pseudocode B

```
<invoke name="GetEuropeanOrders" operation="null" partnerLink="null"
portType="wpc:null" wpc:displayName="GetEuropeanOrders"
wpc:id="7">
```

-continued

```
<dataManagementActivity xsi:type="tDataManagementActivity">
    <statement xsi:type="tSqlStatement">
        <dataSource variable="DataSourceVariable"
        part="myDataSource" />
        <resultSetReference variable=
        "ResultSetReference_Europe"
        part="mySetReference"
        preparation="ifNeeded"
        cleanup="yes"
        cleanupScope="instance" />
        <body>
            SELECT OID, CID, TYPE, TOTPRICE, DATE
            FROM
            <setReference variable="SetReference_OrdersEurope"
            part="mySetReference"
            preparation="no" cleanup="no" />
        </body>
    </statement>
    <statement xsi:type="tSqlStatement">
        <dataSource part="myDataSource"
        variable="DataSourceVariable" />
        <body>
            UPDATE
            <setReference variable="ResultSetReference_Europe"
            part="mySetReference"
            preparation="no" cleanup="no" />
            SET TOTPRICE =
            BO.EURO_TO_DOLLAR(TOTPRICE)
        </body>
    </statement>
</dataManagementActivity>
<sources>
    <source linkName="Link1" />
</sources>
</invoke>
```

The following sample Pseudocode C illustrates the workflow description for the GetUSOrders data management activity 722. The GetUSOrders data management activity 722 loads US data into a set reference stored in BPEL variable ResultSetReference_US. The life cycle attributes of this result set reference are set in such a way that the underlying database table is only created if it does not exist (preparation="ifNeeded"), the table will be deleted (cleanup="yes"), and the deletion of the table is done at process instance end (cleanupScope="instance").

Pseudocode C

```
<invoke name="GetUSOrders" operation="null" partnerLink="null"
portType="wpc:null" wpc:displayName="GetUSOrders" wpc:id="8">
    <dataManagementActivity xsi:type="tDataManagementActivity">
        <statement xsi:type="tSqlStatement">
            <dataSource part="myDataSource"
            variable="DataSourceVariable" />
            <resultSetReference variable="ResultSetReference_US"
            part="mySetReference"
            preparation="ifNeeded" cleanup="yes"
            cleanupScope="instance" />
            <body>
                SELECT OID, CID, TYPE, TOTPRICE, DATE
                FROM
                <setReference variable="SetReference_OrdersUS"
                part="mySetReference"
                preparation="no" cleanup="no" />
            </body>
        </statement>
    </dataManagementActivity>
    <sources>
        <source linkName="Link2" />
    </sources>
</invoke>
```

The following sample Pseudocode D illustrates the workflow description for the UnionOrders data management activity 724. The UnionOrders data management activity 724 represents the union of US and converted European orders. The resulting set of data is stored as a set reference in the BPEL variable ResultSetReference_Union.

Pseudocode D

```
<invoke name="UnionOrders" operation="null" partnerLink="null" portType="wpc:null"
wpc:displayName="UnionOrders" wpc:id="9">
    <dataManagementActivity xsi:type="tDataManagementActivity">
        <statement xsi:type="tSqlStatement">
            <dataSource part="myDataSource"
          variable="DataSourceVariable" />
            <resultSetReference cleanup="no" part="mySetReference"
            preparation="ifNeeded"
            variable="ResultSetReference_Union"/>
            <body>
                SELECT OID, CID, TYPE, TOTPRICE, DATE FROM
                <setReference variable="ResultSetReference_Europe"
            part="mySetReference"
            preparation="no" cleanup="no" />
                UNION ALL SELECT OID, CID, TYPE, TOTPRICE, DATE FROM
                    <setReference cleanup="no" part="mySetReference"
            preparation="no"
            variable="ResultSetReference_US" />
            </body>
        </statement>
    </dataManagementActivity>
    <targets>
        <target linkName="Link1" />
        <target linkName="Link2" />
    </targets>
    <sources>
        <source linkName="Link3" />
    </sources>
</invoke>
```

The following sample Pseudocode E illustrates the workflow description for the MaterializeOrders data management activity 726. The MaterializeOrders data management activity 726 materializes the contents of the unified order table into the process context. In the <from> element of the statement, the source of the data for the materialization is specified and the <to> element represents the materialization target. That is, the contents of set reference ResultSetReference_Union will be materialized into the BPEL variable MaterializedOrders, part myMaterializationResult.

Pseudocode E

```
<invoke name="MaterializeOrders" operation="null" partnerLink="null"
portType="wpc:null" wpc:displayName="MaterializeOrders"
wpc:id="10">
    <dataManagementActivity xsi:type="tDataManagementActivity">
        <statement xsi:type="tMaterializationStatement">
            <from part="mySetReference"
          variable="ResultSetReference_Union" />
            <to part="myMaterializationResult"
          variable="MaterializedOrders" />
        </statement>
    </dataManagementActivity>
    <targets>
        <target linkName="Link3" />
    </targets>
</invoke>
```

Figure 8:
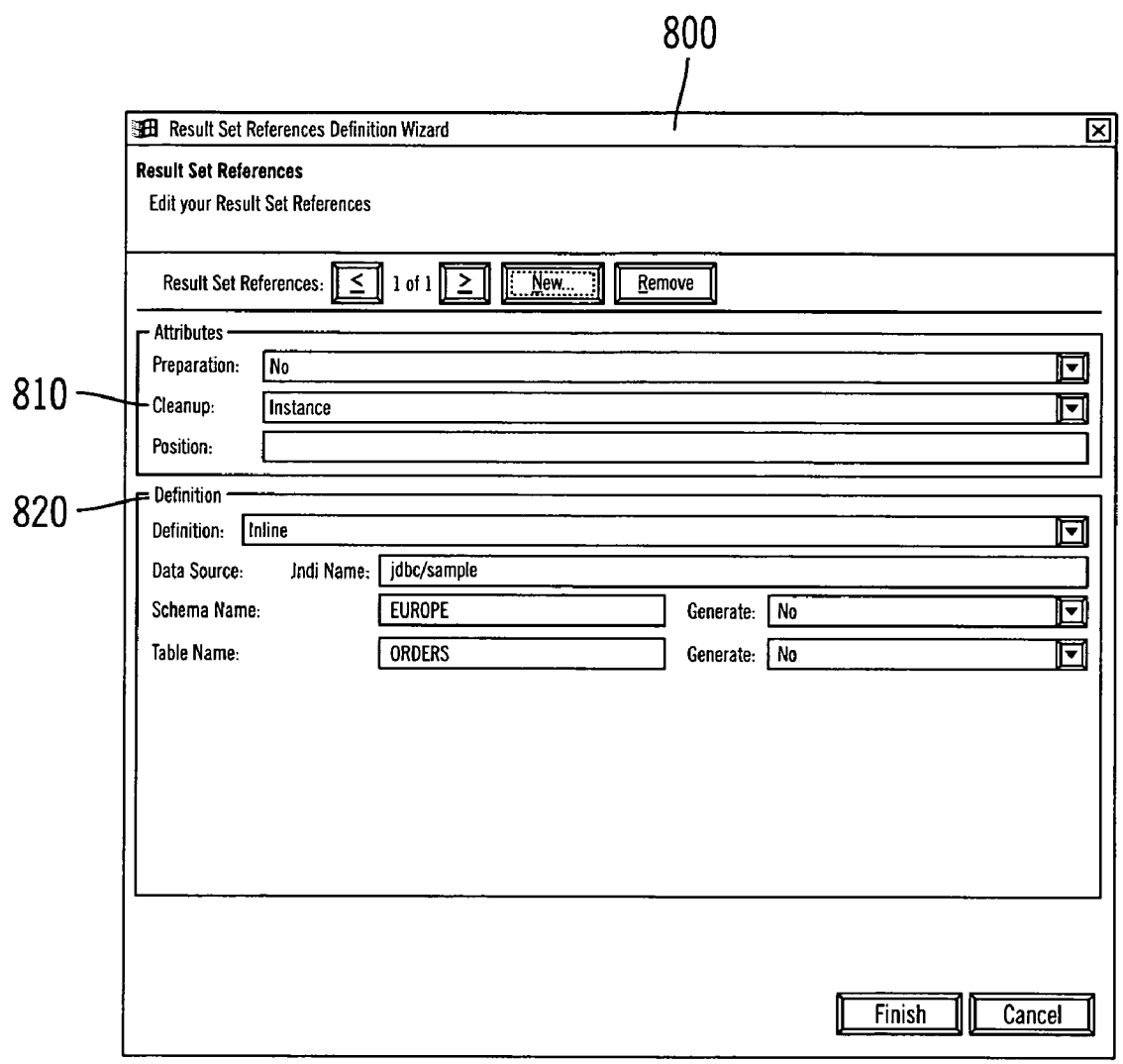
FIG. 8 illustrates a Result Set References Definition Wizard in accordance with certain embodiments.

A result set reference is specified as part of the specification of the data management activity that creates the result set. To specify a result set reference, a user selects a create result set reference button, 7 which results in a result set references definition wizard 800 being displayed (FIG. 8). FIG. 8 corresponds to the result set reference used in the "GetEuropeanOrders" activity 720 (FIG. 7). In the result set references definition wizard 800, the "attribute" section of this panel can be used to define life cycle management options. For example, a user identifies life cycle attributes 810, such as whether cleanup 810 is required and at which point in time the cleanup should be performed. In this example, the result set will be cleaned up at the end of the process (i.e., at the end of the "instance").

The user also provides the definition 820 of the result set reference, e.g. by providing a data source, and the identification of an existing table to hold the result or by specifying that the result set should be generated by the data management operation support component. In this example, a data source, schema name and table name are explicitly specified.

FIGS. 9A, 9B, 9C, 9D, and 9E provide sample pseudocode 900, 910, 920, 930, 940 for the workflow 810 in accordance with certain embodiments. Pseudocode B, C, D, and E are part of the illustrated pseudocode 900, 910, 920, 930, 940.

Thus, for integration of data management operations into a workflow system, the data management operations are integrated as first class citizens into workflow systems for business processes. Embodiments offer the following characteristics with respect to data management operations:

1. New data management activities that consist of a declarative description of data management operations.

2. A mechanism to directly specify business process variables as input parameters for these operations.

3. A mechanism to directly specify how results of these operations are stored in business process variables.

4. A mechanism to specify a data source to be used during runtime.

5. A mechanism to define set references with life cycle attributes.

Embodiments remove the problems with the conventional approaches, such as reducing the skill set needed to implement data management activities and reducing the development time needed to do so.

An integrated system is achieved by supporting data management operations as fist class citizens at three different levels: at the design time system tool 120, within the workflow language (used for the workflow description 130), and at the workflow runtime system 150. The workflow design time system 120 is enhanced by support for specific data management activities. The workflow language is enhanced by a mechanism to specify data management activities "inline" as part of a workflow description, including the ability to directly use process variables as input and output parameters for activities.

The workflow runtime system 150 receives a workflow description 130. The workflow runtime system 150 is enhanced by a data management operation support component 152 that is able to execute the data management operations defined in the workflow description 130, including support for set references and life cycle management for the corresponding sets. The data management operation support component 152 accesses one or more data management systems 160a . . . 160n to execute the data management operations specified.

Another example is provided to enhance understanding of embodiments of the invention. In particular, in this example, information about orders is stored in a relational database system, and a busines's process checks a total amount of orders from a certain region. In this example, the region is an input parameter to the business process (i.e., a business process input variable). The database management operation is a SELECT query. The result of the query is stored in a variable, so that the result may be used by follow-on activities.

Embodiments provide inline SQL for workflow languages for business processes (e.g., BPEL). In case of the WPC workflow system and of SQL support, integration as a first class citizen into the workflow runtime system 150 means that the workflow runtime system 150 directly supports SQL code. Inline SQL statements allow a declarative description of data management activities (called "SQL snippets" or "DMAs", which are similar to "Java® snippets") to be included in the workflow description 130.

Example pseudocode for a SQL activity for a WPC workflow runtime system is shown as Pseudocode F. The text of "select count(*) into", "from ORDERS", and "where REGION=" of Pseudocode F shows how the SQL query is specified. The elements <dataSource variable="DMA_Data_Source" part="dataSource"/>specify a data source to be used. The elements specify an output parameter.

The elements specify an input parameter. Thus, business process variables may be input and output parameters and a data source may be specified via a business process variable.

Pseudocode F

```
<?xml version="1.0" encoding="UTF-8"?>
<wpc:dataManagementActivity  [...]>
  <dataSource variable="DMA_Data_Source" part="dataSource"/>
  <dmaStatement xsi:type="wpc:DMAStatementType">
    <operation type="query" xsi:type="wpc:OperationType">
```

-continued

```
      select count(*) into
          <parameter kind="out"
              property="NB_EXCEPTIONAL_ORDERS"
  variable="Parameter" />
          from ORDERS
          where REGION =
              <parameter kind="in" property="MAX_PRICE"
                  variable="Parameter" />
    </operation>
  </dmaStatement>
</wpc:dataManagementActivity>
```

The integrated system is able to understand both the semantics of the business process itself (e.g., how activities relate to each other) as well as the semantics of data management activities within this business process.

Embodiments provide a workflow system that supports a concept of set references that overcome the deficiencies of conventional workflow systems.

A set reference may be described as pointer to a set of data. For example, a set reference may be a table name and additional information for locating the set of data. The set reference may include, for example, information on how to access the set; meta information about the set; and set properties, such as statements to create and delete the set. A set reference may be bound to a business process variable, and may be used as input and output sets for statements. A set reference enables passing sets between activities by forwarding the set reference rather than by copying the set of data. For example, a first data management activity may create a set reference, and a second data management activity may use the set reference. The set reference supports a dynamic infrastructure (e.g., source and target sets may be changed at business process runtime).

In certain embodiments, a set reference points to a set that is accessible via a single data management system 160a . . . 160n (e.g., a table or a view in a relational database system). The data management system 160a . . . 160n may be a federated system that is able to work with sets where the corresponding records reside in different data management systems 160a . . . 160n.

The following pseudocode provides an example of a set reference being defined as Pseudocode G. Pseudocode G uses resultSetReference part="reference" variable= "SelectedEmployeesSetReferenceVariable"/and setReference part="reference" variable="AllEmployeesSetReferenceVariable"/to define set references.

Pseudocode G

```
...
<resultSetReference part="reference"
variable="SelectedEmployeesSetReferenceVariable"/>
select empno,firstnme,lastname,phoneno,sex
from <setReference part="reference"
variable="AllEmployeesSetReferenceVariable"/>
where lastname like
    '<parameter kind="in" property="namePrefix"
    variable="InputVariable"/>'
...
```

A set reference may point to an existing set, as well as, represent the result of a data management activity that has not yet been executed. In the latter case, a set reference may contain meta information instructing the data management activity about the characteristics the set should obey.

Support for set references include the following workflow system capabilities:

1. Set references are supported by the workflow tools and the APIs of the workflow system. Users may directly specify and modify set references (an example of first class citizen support).

2. Set references may be specified and modified at various points in time including at design time of a business process, at deployment time of a business process, or at business process runtime.

3. Set references may be directly used as input and output parameters for data management activities.

As an example, a set reference may represent a table or a view in a relational database system. The address information contains the information needed to access the set of data (e.g., the specification of the data source (e.g., a JNDI name), a schema and a table name, and a description of how to authenticate (e.g., with the credentials of the current user who is running the business process)). The metadata information in the set reference describes the columns of the table or view.

The set reference support allows binding an existing table in a certain data source to a set reference "S1" via a business process activity. This activity may, for example, be a registry lookup operation. S1 may then be used in the FROM clause of a subsequent SQL SELECT activity (i.e., S1 may be used as a set-valued input parameter). The result of this SQL SELECT statement may be bound to a second set reference "S2" that again may be used in subsequent data management activities.

Set-oriented processing may be performed using a workflow language while loop over a set of objects representing rows of a table where a lookup in some data source is performed to enrich the data, a Web service is called to check for certain characteristics, and an update is performed based on this characteristics. Also, a single set-oriented SQL update operation may be provided. The set-oriented processing avoids materialization of large sets and reduces the number of accesses to the data source.

Embodiments provide life cycle management for sets created by a business process. It may be a frequent task for users to create sets for using them in certain business process activities and to drop sets as soon as they are no longer needed. Therefore, embodiments provide life cycle management extensions for set references that simplify the creation and deletion of sets. The extensions include a mechanism that creates a set automatically at a certain point in time, including at business process deployment time, at business process creation time, when a certain scope within a business process starts, or when a certain activity within a business process starts.

The extensions also include a mechanism that drops a set that has been created by the business process automatically at a certain point in time, including at the end of the activity that created the set, at the end of the scope in which the set was created, at the end of the business process, or at undeployment time. The creation and dropping may also be user managed (i.e., the set may survive the business process).

The following pseudocode provides an example of use of the life cycle management extensions as Pseudocode H. In Pseudocode H, cleanup="yes" cleanupScope="process" preparation="yes" indicate that a set is to be dropped when the business process ends and that a new set is automatically created by the data management operation support component 152 each time the activity that contains Pseudocode H is executed.

Pseudocode H

```
...
<resultSetReference cleanup="yes" cleanupScope="process"
preparation="yes"
part="reference" variable="SelectedEmployeesSetReferenceVariable"/>
select empno,firstnme,lastname,phoneno,sex
from <setReference part="reference"
variable="AllEmployeesSetReferenceVariable"/>
where lastname like '<parameter kind="in" property="namePrefix"
variable="InputVariable"/>'
...
```

Embodiments enable integration of data operations into a workflow and enable optimization of a workflow containing data operations. Embodiments may be used with ETL and business process integration.

IBM, MQSeries, Websphere and DB2 are registered trademarks and/or common law marks of International Business Machines Corporation in the United States and/or foreign countries. Java is a registered trademark and/or common law mark of Sun Microsystems in the United States and/or foreign countries. Oracle is a registered trademark and/or common law mark of Oracle Corporation in the United States and/or foreign countries. Excel is a registered trademark and/or common law mark of Microsoft Corporation in the United States and/or foreign countries.

Additional Embodiment Details

The described embodiments may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adapters, etc., may be implemented in one or more integrated circuits on the adapter or on the motherboard.

Certain embodiments may be directed to a method for deploying computing infrastructure by a person or automated processing integrating computer-readable code into a computing system, wherein the code in combination with the computing system is enabled to perform the operations of the described embodiments.

The term logic may include, by way of example, software or hardware and/or combinations of software and hardware.

The logic of FIG. 2 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIG. 2 may be implemented in software, hardware, programmable and non-programmable gate array logic or in some combination of hardware, software, or gate array logic.

Figure 10:
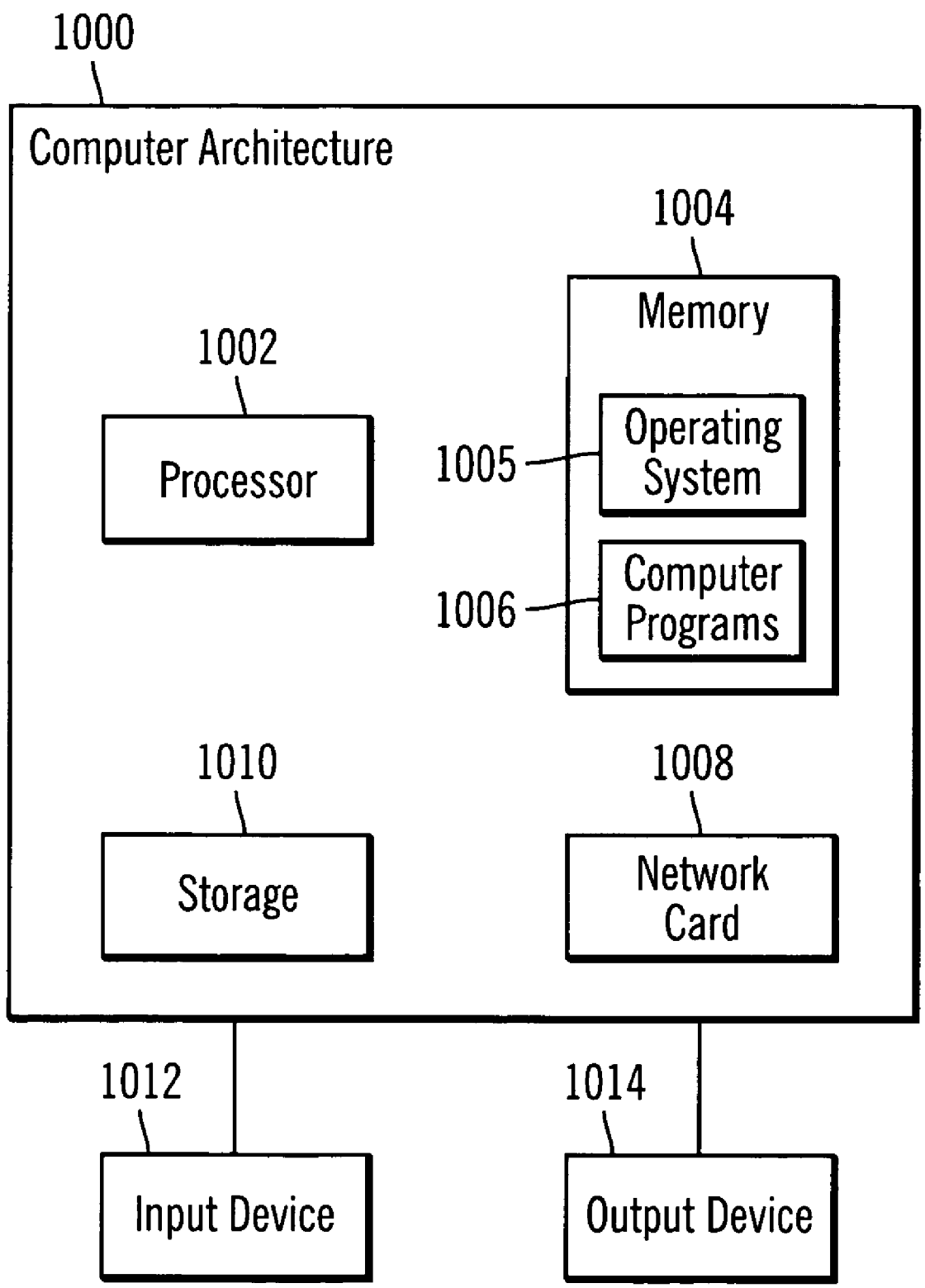
FIG. 10 illustrates an architecture of a computer system that may be used in accordance with certain embodiments.

FIG. 10 illustrates an architecture 1000 of a computer system that may be used in accordance with certain embodiments. Computing devices 100 and 140 may implement architecture 1000. The computer architecture 1000 may implement a processor 1002 (e.g., a microprocessor), a memory 1004 (e.g., a volatile memory device), and storage 1010 (e.g., a non-volatile storage area, such as magnetic disk drives, optical disk drives, a tape drive, etc.). An operating system 1005 may execute in memory 1004. The storage 1010 may comprise an internal storage device or an attached or network accessible storage. Computer programs 1006 in storage 1010 may be loaded into the memory 1004 and executed by the processor 1002 in a manner known in the art. The architecture further includes a network card 1008 to enable communication with a network. An input device 1012 is used to provide user input to the processor 1002, and may include a keyboard, mouse, pen-stylus, microphone, touch sensitive display screen, or any other activation or input mechanism known in the art. An output device 1014 is capable of rendering information from the processor 1002, or other component, such as a display monitor, printer, storage, etc. The computer architecture 1000 of the computer systems may include fewer components than illustrated, additional components not illustrated herein, or some combination of the components illustrated and additional components.

The computer architecture 1000 may comprise any computing device known in the art, such as a mainframe, server, personal computer, workstation, laptop, handheld computer, telephony device, network appliance, virtualization device, storage controller, etc. Any processor 1002 and operating system 1005 known in the art may be used.

The foregoing description of embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments can be made without departing from the spirit and scope of the invention, the embodiments reside in the claims hereinafter appended or any subsequently-filed claims, and their equivalents.

What is claimed is:

1. A method for processing a workflow, comprising:
receiving a workflow including one or more data management activities that access and manage one or more data management systems, wherein at least one data management activity includes an input set reference that points to a set of data that resides in a data management system, wherein the set of data is to be used as input to the at least one data management activity;
generating a workflow description from the workflow that includes a description of the one or more data management activities, wherein at least one data management activity includes a data source definition that selects a data source at run time;
generating one or more data management operations from the workflow description for the one or more data management activities; and
executing the one or more data management operations against the one or more data management systems, wherein the execution of the one or more data management operations includes replacing the input set reference with values extracted from a business process variable, and wherein at least one data management operation is executed against a data management system depending on the data source definition attached to a data management activity corresponding to the at least one data management operation, wherein results of the execution are written into a business process variable or a portion of a business process variable.

2. The method of claim 1, wherein the input set reference contains information to access the data management system and to manage the corresponding set of data.

3. The method of claim 2, wherein one or more life cycle attributes are associated with the set reference.

4. The method of claim 2, wherein the set reference comprises a mapping to a business process variable or to a part of a business process variable.

5. The method of claim 1, wherein at least one data management activity includes a business process variable as an input parameter.

6. The method of claim 1, wherein at least one data management activity includes a business process variable as an output parameter.

7. The method of claim 1, wherein the data source definition comprises mapping a data source to a business process variable or to a part of a business process variable.

8. The method of claim 1, further comprising receiving results from the one or more data management systems.

9. The method of claim 1, wherein a first data management activity defines a set reference and wherein a second data management activity uses the set reference.

10. The method of claim 1, wherein each data management operation comprises a query.

11. The method of claim 1, wherein each data management activity corresponds to one of the one or more data management activities.

12. The method of claim 1, further comprising enabling creation of new data management activities.

* * * * *